(No Model.)
J. W. SPANGLER.
SHUTTER WORKER.
No. 547,092. Patented Oct. 1, 1895.
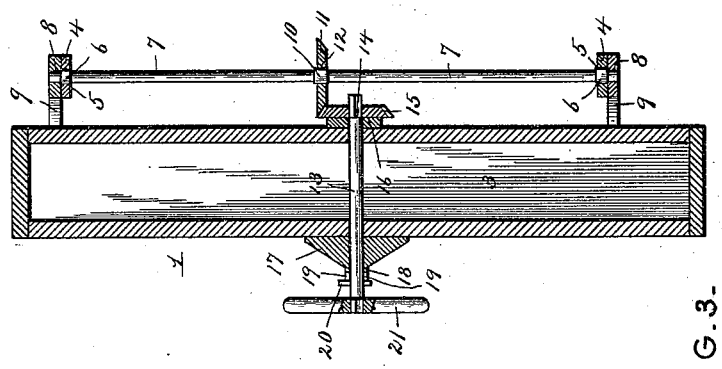
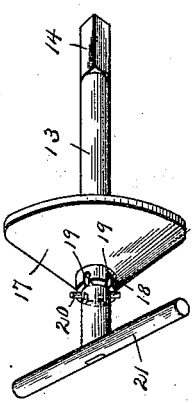
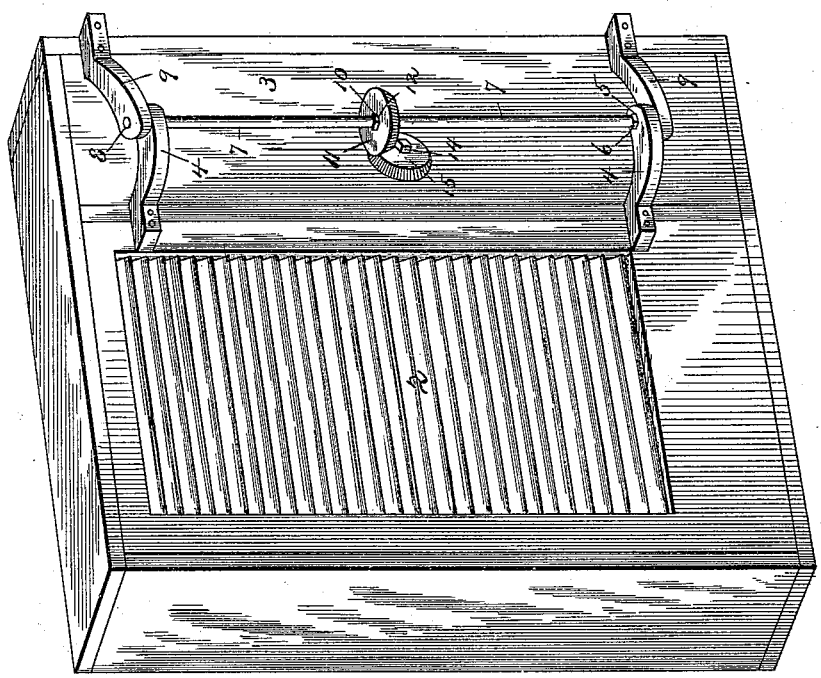
Witnesses
Harry L. Ames
J. B. Devens
Inventor
Joseph W. Spangler.
By his Attorneys,
C. A. Snow & Co.

UNITED STATES PATENT OFFICE.

JOSEPH W. SPANGLER, OF POMONA, KANSAS.

SHUTTER-WORKER.

SPECIFICATION forming part of Letters Patent No. 547,092, dated October 1, 1895.

Application filed November 10, 1894. Serial No. 628,440. (No model.)

*To all whom it may concern:*

Be it known that I, JOSEPH W. SPANGLER, a citizen of the United States, residing at Pomona, in the county of Franklin and State of Kansas, have invented a new and useful Shutter-Worker, of which the following is a specification.

This invention relates to that class of window-shutter operating mechanism wherein the shaft is passed through the frame of the window and combined with a pair of beveled gears respectively connected to the shaft and window-shutter, whereby upon the revolution of the shaft the shutter may be swung on its hinges.

The improvement consists of the novel features and the peculiar construction and combination of the parts which hereinafter will be more fully set forth and claimed, and which are shown in the accompanying drawings, in which—

Figure 1 represents a perspective view of the outer portion of a window-shutter to which my improvements are applied; Fig. 2, a vertical section taken through the rod or shaft upon which the shutter is mounted and through the shaft to which the power for operating the shutter is applied; Fig. 3, a detail perspective of the arrangement at the inner end of the operating-shaft, whereby said shaft may be locked, as aforesaid.

The reference-numeral 1 indicates the frame of the window, and 2 the shutter thereof, both of which may be of any preferred construction, with the exception in the frame of a laterally-extended portion 3, formed at one side thereof and provided to afford a bearing for the operating-shaft, as will be more fully described hereinafter. Secured to the shutter 2 and projecting horizontally thereon and beyond the inner side are the hinge-sections 4, which extend away from the shutter and which are provided at their outer ends with square openings 5. The openings 5 are vertically aligned with each other and respectively receive the square portions 6 of the vertically-extending rod or shaft 7. The shaft 7 projects above and below the respective hinge-sections 4 and has its projected portions rounded, so that they may be revolubly arranged in the correspondingly-shaped openings 8 of the hinge-sections 9. The hinge-sections 9 are secured to the frame 1 and project away from the same diagonally and inwardly toward the sections 4, each pair of hinge-sections describing when the shutter is closed a V. Formed midway the shaft 7 is the squared portion 10, which is provided to receive the correspondingly-shaped opening 12 of the beveled gear 11, whereby said beveled gear is fixed to the said shaft 7, so as to revolve in unison therewith. Revolubly mounted in the part 3 of the window-frame 1 and extending transversely through the same is the operating-shaft 13, which projects beyond each side of the frame and is capable of independent longitudinal movement within the same. The outer end of the shaft 13 is square, as shown at 14, so that the gear 15 may be mounted thereon. The gear 15 is beveled in conformity with the gear 11 and meshes therewith.

16 indicates a collar, which is interposed between the gear 15 and the outer side of the casing, and which is mounted upon the shaft 14, said collar being provided to prevent the gear 15 from moving too far inwardly and from engaging the window-frame.

Loosely embracing the inner end of the shaft 13 is the conical collar 17, which is fixed to the inside of the window-frame, and which has its apex or inner extremity formed with a collar 18. The collar 18 has formed therein the oppositely-arranged notches 19, which are four in number and disposed in two pairs, the notches of each pair being oppositely-arranged, as explained. These notches are adapted to receive the pin 20, according to the location of the same. The pin 20 is rigidly secured in the shaft 13 and projects through the same and beyond each side, so that the projected ends may fit in either pair of notches 19, as may be desired.

21 indicates a handle-bar, which is fixed to the inner extremity of the shaft 13 by a mortise connection, and it is by these means that the revolution of the shaft is facilitated. It will be seen that by means of the above-described construction the shaft 13 may be moved longitudinally in its bearings, which will cause the pin 20 to engage or disengage with the notches 19, according to the movement which is imparted to the shaft. Thus, if the shaft be moved inwardly, the pin will be caused to engage the notches, or, if moved outwardly, to disengage them. This operation has the effect of locking or unlocking the shaft, and consequently of locking or unlocking the window-shutter. This longitudinal movement of the shaft 13 will not affect the gear 15, for this gear, being loose on the shaft and being held by the collar 16 and gear 11, remains in the same position, irrespective of the movements of the shaft 13. Thus it will be seen that the gears 11 and 15 are always engaged with each other, whether the shaft 13 be locked or unlocked.

The use of my invention will be readily understood and will not require any detailed description. It will suffice for me to say that the opening and closing of the shutter 2 is effected by merely oscillating the shaft 13, which will revolve the shaft 7, and consequently swing the shutter.

Having described the invention, I claim—

1. In window shutter operating mechanism, the combination of upper and lower hinge sections secured, respectively, to the shutter and the frame, a rod journaled at its ends in the hinge sections of the frame and having angular portions fitting in corresponding openings of the shutter hinge sections, a bevel gear wheel mounted upon the rod so as to turn therewith, an operating shaft journaled horizontally in the frame and having its outer end made angular, a gear wheel mounted upon the angular end of the operating shaft and meshing with the gear wheel of the said rod, a collar secured to the inner side of the frame and having a series of pairs of notches in its outer face, and a pin passing transversely through the operating shaft and adapted to be engaged with or disengaged from a pair of the said notches by a longitudinal movement of the operating shaft in its bearings so as to release or secure the window shutter, substantially as set forth.

2. In combination, a frame, upper and lower hinge sections secured to the frame and extending diagonally therefrom and toward its middle, corresponding hinge sections secured to the shutter and projecting diagonally therefrom in an opposite direction to the hinge sections of the frame, a vertically-disposed rod pivotally connecting the hinge sections and journaled at its ends in the hinge sections of the frame, and having angular portions which are fitted in corresponding openings in the hinge sections of the shutter, a bevel gear wheel mounted upon the rod so as to turn therewith, an operating shaft journaled in the frame and adapted to move longitudinally therein, the outer end of the said shaft being angular and the inner end having an operating handle, a gear wheel mounted upon the angular end of the shaft and meshing with the gear wheel of the rod, a collar between the gear wheel and the frame, a second collar embracing the inner end of the operating shaft and provided with a flange extending from the inner side thereof, and formed with a series of pairs of notches, and a pin passing transversely through the operating shaft and adapted to be engaged with a pair of the said notches to lock the shutter in any required position, substantially as specified.

In testimony that I claim the foregoing as my own I have hereto affixed my signature in the presence of two witnesses.

JOSEPH W. SPANGLER.

Witnesses:
JAMES K. BAILEY,
O. M. WILBER.